(12) United States Patent
Fischer et al.

(10) Patent No.: US 6,546,857 B2
(45) Date of Patent: Apr. 15, 2003

(54) MACHINE FOR PROCESSING HOLLOW GLASS OBJECTS

(75) Inventors: Wolfgang Fischer, Mainz-Mombach (DE); Alois Christ, Wiesbaden (DE); Michael Kaus, deceased, late of Mainz (DE), by Angelika Kaus, legal representative; Heiner Mühl, Mainz-Mombach (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/803,101

(22) Filed: Mar. 12, 2001

(65) Prior Publication Data

US 2001/0020371 A1 Sep. 13, 2001

(30) Foreign Application Priority Data

Mar. 10, 2000 (DE) .......................................... 100 11 861

(51) Int. Cl.⁷ .......................... B41F 17/14; B41F 17/28; B41F 15/18; B41F 15/20; B41L 13/02
(52) U.S. Cl. .......................... 101/40; 101/126; 101/123; 198/346.2
(58) Field of Search ........................... 198/345.1, 346.1, 198/346.2; 101/44, 38.1, 39, 40, 40.1, 114, 126, 123

(56) References Cited

U.S. PATENT DOCUMENTS

| | | | |
|---|---|---|---|
| 5,494,230 A | * | 2/1996 | Dolgas ..................... 242/433.4 |
| 5,826,692 A | * | 10/1998 | Blanc ......................... 198/340 |
| 2001/0017181 A1 | * | 8/2001 | Otruba et al. .................. 156/64 |

FOREIGN PATENT DOCUMENTS

| | | | | |
|---|---|---|---|---|
| DE | 4006940 A1 | * | 9/1991 | ........... B65G/19/02 |
| GB | 1448863 A | * | 9/1976 | ........... B23K/19/02 |

* cited by examiner

*Primary Examiner*—Daniel J. Colilla

(57) ABSTRACT

A machine for processing hollow glass objects (8) is described. The machine includes a sequence of like processing units (1) to (15) and (A, B) on which a small number of processing steps can be carried out on the workpiece (8). The workpieces (8) are brought to the processing unit on a clock-driven loading belt (4) and taken therefrom. A workpiece, which is being processed in a unit, is held during the entire sequence by one and the same workpiece holder. Each processing unit includes two separate handling units with which two workpieces run through the workstations time displaced. The machine arrangement permits processing units to be taken out or switched into the line without a production standstill.

18 Claims, 3 Drawing Sheets

MACHINE FOR PROCESSING HOLLOW GLASS OBJECTS

FIELD OF THE INVENTION

The invention relates to a machine for processing workpieces on which a sequence of different processing steps is to be carried out, especially a machine for processing workpieces of thermally deformable material such as hollow glass objects. Here, it is not necessary that a thermal softening need precede each processing step.

The invention relates further to individual processing units for such a machine and, in special application, a processing unit for, on the one hand, the edge melt-off and the forming of spouts on glass vessels and, on the other hand, also a processing unit for printing onto such vessels with screen printing.

BACKGROUND OF THE INVENTION

In known manufacturing lines for hollow glass objects, the individual work steps are generally carried out on rotation units of which each is equipped with a plurality of workstations of the same kind. The workpieces are supplied to such a rotation unit sequentially at a specific location by means of complex handling systems, which often require a multiple transfer of the workpiece, and are again removed after processing via additional handling units at another location. It was up to now conventional to carry out the melt-off of the work ring from hollow glass vessels and the subsequent forming of a spout thereon during series manufacture on separate rotation units. Disturbances in the flow of the articles arise because of the multiple handling operations. Furthermore, often article-specific tools are required for the handling apparatus. In the rotation unit, all stations have to be equipped with tools even when the required machine capacity can be provided with fewer stations, for example, with small quantities. This not only leads to increased investment costs for the tools but also to unnecessarily high standstill times when the articles are exchanged. If a disturbance occurs on a rotation unit or on a handling unit, then, as a rule, the entire machine or assembly line must be shut down.

SUMMARY OF THE INVENTION

In the following, the machine of the invention is described with respect to the application to hollow glass objects and is primarily for use in a continuous assembly line manufacture. In its basic configuration, the machine according to the invention can, however, also be applied to processing workpieces made of other material and, in a special configuration of the workstations, the machine can also be utilized for carrying out processing steps which are not mentioned in the context of this description. For this reason, the description in its application to glass objects should not be understood as limiting.

The object of the invention is a machine for processing workpieces in a continuous assembly line which permits a flexible mode of work and can function with a minimum of work tools and which reduces the handling operations and does not have to be switched off when there is a disturbance at a single processing unit.

The machine of the invention is for processing workpieces of a deformable material including hollow glass objects. The machine includes: at least two processing units for the workpieces and each processing unit having at least one workstation; a conveyor unit for supplying the processing units with the workpieces to be processed and for taking processed workpieces away from the processing units; the conveyor unit being configured to move the workpieces in a basic direction; the two processing units being of the same kind and being arranged along the conveyor unit; the one workstation of each processing units being arranged stationary; each processing unit including two handling units and each of the handling units functioning to take a workpiece from the conveyor unit, move the workpiece to and in the workstation and return the processed workpiece back to the conveyor unit; and, the handling units being configured for a time-displaced, like function simultaneous work sequence in a direction which runs essentially transversely to the basic direction of the conveyor unit.

When, for a conventional machine, individual processing units configured as rotation units were arranged one behind the other with each processing unit carrying a plurality of the same workstations, the invention provides a plurality of the same processing units arranged along the assembly line one behind the other, the processing units being equipped only with a low number of stationary, especially different, workstations so that some work operations can be carried out sequentially on the workpiece, the workpiece being held by one and the same workpiece holder without further transfer while passing through a processing unit.

When it is required that the conveyor unit be configured to move the workpieces in a basic direction which, in general, is the production direction of the assembly line, this does not mean that the conveyor unit must necessarily be a linear conveyor. In accordance with space conditions, the conveyor unit can have angles and turns insofar that the individual processing units are arranged in a series one behind the other next to the conveyor unit and the workpieces, when they leave a processing unit, are moved farther in the same direction from which they had come. Preferably, the conveyor unit is, however, a linear conveyor and especially preferred is such a conveyor having two parallel paths. On a loading conveyor, the workpieces are moved ahead and, on a parallel unloading conveyor, are moved farther. Of course, the unloading conveyor of a machine can simultaneously be the loading conveyor for the next-following machine.

The machine is so configured that the loading conveyor as well as the unloading conveyor are clock driven so that the workpieces can be removed from the conveyor unit at standstill thereof and can again be unloaded thereon. When the workstations of the processing units are characterized as stationary, this does not preclude that parts of a workstation can also be movable to a limited extent. Rather, the characterization of stationary expresses that the workstations are configured in total as stationary and do not move as on the rotation unit.

The two handling units, which belong to each processing unit, move the workpieces essentially transversely to the conveyor unit. Transverse must not necessarily mean at right angles. Depending upon the space requirements or space use, the processing units can be aligned at a specific angle to the basic direction of the conveyor unit.

The processing units are practically configured to be modular-like so that, if required, a processing unit can be exchanged without difficulty for one of the same kind. The number of processing units of the same type, which are arranged one behind the other, is dependent upon the type and duration of the working steps to be carried out in such a processing unit when a certain production assembly line capacity is pregiven. All processing units of a type, which are in service, operate more or less in parallel, that is, when the clocked conveyor unit stops, workpieces are simultaneously taken from the conveyor unit by all like processing units or are again supplied thereto. This can be achieved via a controlled interaction between the conveyor unit and the processing units. If one of the processing units becomes defective, then it can easily be taken out of the sequence. The conveyor unit is then loaded with workpieces in a different way. Purposefully, one or two processing units are provided as reserve and can be taken into service when others are temporarily out of service. Also, the capacity of the machine can be adapted to different production sequences in that one selectively switches some processing units out of the sequence in a controlled manner and, for example, for small lots or longer operating times in other machines of the assembly line, the particular machine is operated only with a reduced number of operating units of the same type.

Further features of the invention which affect only the processing unit are described in the following with respect to the individual processing units.

The individual processing unit is provided with two essentially the same handling units each of which is equipped with a single workpiece holder for an individual workpiece. The workpiece remains connected to the workpiece holder during the entire sequence in the processing unit from the pickup from a close conveyor unit until delivery to the conveyor unit. A delivery of a workpiece to another unit does not take place. The two handling units are so configured that they run through functionally the same work cycles but are displaced in time. The individual processing unit can be provided with only one workstation but, preferably, is provided with two or fewer workstations. The complete functionality of the invention becomes effective only when these workstations are of a different type, that is, a series of sequential work steps can be carried out with them on one workpiece. Precisely this mode of operation requires the time-displaced interaction of the two handling units with the different workstations.

In a preferred embodiment, the workstations of a processing unit are arranged in a series in a such a manner that one can define a vertical central plane which runs through the centers of the workstations. This central plane extends, as indicated above in another way, purposefully approximately transverse or even exactly at right angles to the basic direction of the conveyor unit to which the processing unit is connected. The two handling units are preferably arranged on both sides of this central plane and each has a primary carriage with which the handling units can be moved horizontally and parallelly in fixed guides at both sides of the central plane.

Corresponding to the arrangement of the workstations with their imaginary center points in the central plane, the imaginary center points of the workpiece holders also lie, in general, in the central plane and are also only movable in this central plane in the preferred embodiment. The horizontal displacement in the X direction takes place via the primary carriage. In addition, the workpiece holders are held on projecting arms from the respective sides into the central plane and are also movable in elevation. This second displacement possibility in the Z direction can be realized via a secondary carriage which is driven perpendicularly on the primary carriage. The possibility is also present to configure the workpiece holders to be pivotable on the respective arm in the central plane which is practical when the workpiece, as a consequence of the working steps, has to be transferrable from an upright into a rotated position or even into an inclined position in the vertical plane. The movement possibilities of the workpiece holders in the X and Y directions can, in the same manner, also be carried out in that a primary carriage is movable in elevation on the machine frame and a secondary carriage is movable horizontally on this frame. What is essential here is that a movability of the workpiece holders is possible in all directions of the central plane.

The vertical movability of the workpiece holders serves not only to guide the workpiece, for example, to a workstation, which is located below, and to lift the same therefrom, but is also necessary in order to prevent collisions between the workpiece holders and the workpieces carried thereby when the two handling units are to pass each other in opposite directions. In this situation, one of the workpiece holders can be lifted such that the other workpiece holder can be moved along under the first workpiece holder and the workpiece carried thereby in the central plane.

For various work steps, it is necessary that the workpiece be rotated during processing. For this case, the workpiece holders are provided with rotational drives. In a special configuration, these rotational drives can be so configured that they can be adjusted at precise angular positions. This is, for example, practical when a work step is to be carried out on a specific peripheral location of the workpiece and this peripheral position can be automatically driven to. To hold the workpiece, the workpiece holders include suction cups, chucks or other known aids. Thus, for example, glass vessels are to be held at the base thereof for processing the edge thereof. For this purpose, suction cups are used in a manner known per se.

It is purposeful to arrange all workstations at approximately the same elevation below the handling units for processing steps which can be carried out exclusively on a suspended workpiece, that is, on a workpiece held from above. In an embodiment of this kind, a simplified configuration results in that one provides for horizontal guidance for the two handling units on both sides of a single fixed cross-beam which extends at a sufficient elevation above the workstations. If, in contrast, workstations are required to whose work tools the work must be approached from below, space is needed between the handling units so that these handling units are guided on separate lateral frame parts.

A special aspect of the invention lies in the application for melting off the work ring, the melting of the separating edge and the forming of a spout in the edge of a glass vessel. The ring melt-off and the forming of the spout was conventionally carried out in two different processing units. In contrast, the processing unit of the invention has, in series, a first workstation for melting off and removing the work ring of a glass vessel as well as for fusing the cut-off edge, a further workstation for preheating the region for the spout and a third workstation for forming the spout. This processing unit will be explained in greater detail in the context of the description of an embodiment.

The joining of the two above-mentioned work steps in one processing unit affords, inter alia, the advantage that the glass vessel must not be heated again all the way from a lower temperature for forming the spout, at least at this location. The glass vessel is transferred into the second workstation as long as its edge is still warm from melting off the work ring. In this way, a considerable amount of energy is saved. Furthermore, separate drives for the moving sequences of work tools become substantially unnecessary because, with the numerically controlled handling unit, the workpiece can be moved in the desired manner relative to the work tool. The handling unit can carry out movements in all three spatial directions while including the rotatability of the workpiece holder. This applies, for example, for warming the edge region for the spout. A desired edge region can be warmed at the desired intensity while using a single stationary burner by means of a rotational angle movement back and forth and a superposed translatory movement of the workpiece toward the burner and away from the burner. Also, the forming of the spout can take place via a movement of the workpiece toward the work tool.

Finally, two workpieces can always be processed simultaneously in the processing unit because of the time-displaced movement sequence of the two handling units.

A further application of the claimed machine, which is provided in accordance with the invention, and of the claimed operating units is the printing of rotationally-symmetrical objects with print formats in the silk screen printing process.

The printing of rotational-symmetrical objects in the silk screen printing process usually takes place with a horizontally arranged silk screen frame which rolls off on the object rotated about its horizontally aligned axis (at least insofar as the printing of cylindrical surfaces is concerned). When the object, which is to be printed (for example, a hollow glass vessel which is brought on a loading belt to the processing unit with its opening directed downwardly), is grasped from above at its base by a workpiece holder configured as a suction cup, then it is necessary for carrying out the printing process that the workpiece holder with the workpiece carried thereby be pivotable into a horizontal direction of its axis. The workpiece holders of the two handling units are therefore, in the present application, attached by means of a cropped angular arm on the horizontally movable primary carriage of the handling units. One arm of the angular level can be pivoted about a horizontal axis on the primary carriage.

The processing unit for the silk screen printing can have two workstations, namely, one for adjusting the fit and the other for the actual printing process. For glass vessels having a spout, the printing, in general, should be applied at a specific peripheral position relative to the spout so that the object, which is to be printed, has to be aligned in a specific angular position before its introduction into the actual printing station. This takes place in the registration station. The work sequence is purposefully so configured that one of the workpiece holders takes over an object from the loading belt in a perpendicular position and transfers the same also in this position to the registration station while another object is located in horizontal alignment in the printing station. In this horizontal alignment, and after the end of the printing process, the second tool holder with the printed object can pass over the first workpiece holder in order to drop off the printed workpiece on the discharge belt while the first workpiece holder with the aligned object now pivots into the horizontal position in order to move into the printing station.

In a special embodiment of the printing station, this station can have more than one silk screen frame one behind the other or a subdivided silk screen frame viewed in the direction of movement of the primary carriage of the handling unit so that a second printing on the workpiece can be carried out after an additional horizontal movement thereof. Here, it can be a second picture but also a second color of a multicolor image. In order to guarantee a problem-free rotation of the workpiece to be printed beneath the silk screen frame, it can be practical to drive the object, which is to be printed, with its opening, which faces away from the suction cup, toward a centering spindle which supports the other end of the object during rotation.

Often, the peripheral surfaces of a rotational-symmetrical object, which is to be printed, are not cylindrical but conical. It is necessary to incline the rotational axis of the object in order to bring this object, which is to be printed, horizontally under the silk screen frame with a surface line of its conical region. In a special embodiment of the invention, this is possible via a corresponding pivoting of the rotatable workpiece holder. The above-mentioned spindle for rotation stabilization can also be provided in this case if it is configured to be correspondingly pivotable. The silk screen printing on a conical surface requires a special circular path shaped sequence movement of the silk screen frame. A silk screen printing arrangement which makes this possible in the smallest space is described in German patent publication 199 21 306. Such an arrangement can be used in the context of the present invention.

BRIEF DESCRIPTION OF THE DRAWINGS

The invention will now be described with reference to the drawings wherein.

DESCRIPTION OF THE PREFERRED EMBODIMENTS OF THE INVENTION

In the following, the machine according to the invention is described with respect to two special embodiments for processing will be described in greater detail, namely, for melting off the work ring and forming the spout and for printing the workpieces.

Figures 1, 2:
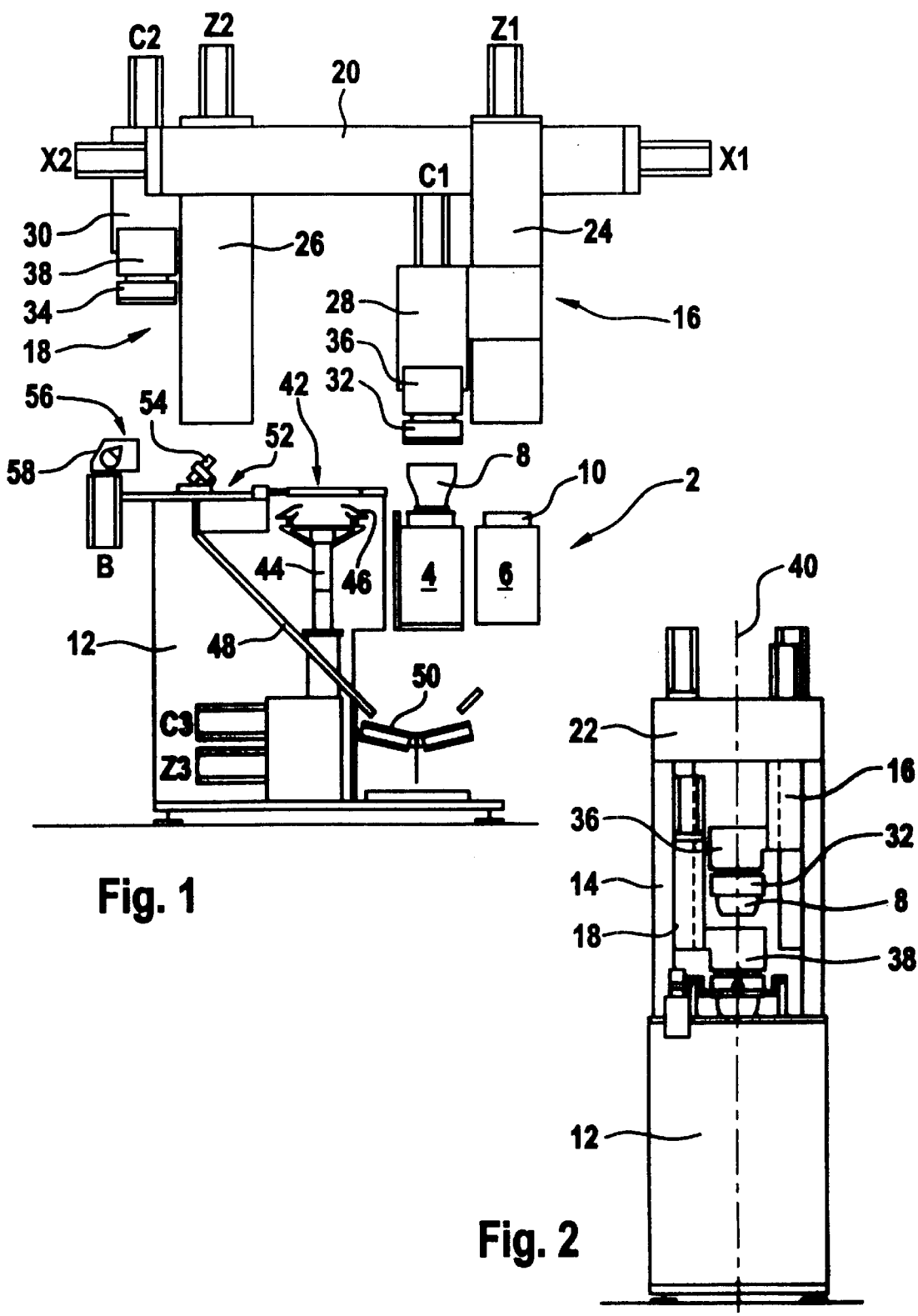
FIG. 1 is a schematic side elevation view of a processing unit for melting off the work ring from hollow glass bodies and for molding a spout.
FIG. 2 is a schematic end view of the processing unit of FIG. 1.

FIGS. 1 and 2 show a processing unit for hollow glass objects which is arranged next to a conveyor unit 2. In the embodiment, the conveyor unit 2 comprises a linear loading belt 4 and a linear unloading belt 6 which run parallel to each other and move in the same direction perpendicular to the plane of the drawing. Under the term "conveyor belt", every linear conveyor is understood which takes up a series of workpieces and is suitable for transporting the workpieces to the processing unit or for removing the workpieces therefrom. In the illustration of FIG. 1, a workpiece in the form of a hollow glass object 8 is disposed on the loading belt 4. The hollow glass object 8 is a glass vessel which rests on the loading belt 4 with its opening directed downwardly. The conveyor belts 4 and 6 can be provided with guides 10 with which the glass vessels, which are to be transported, can be aligned in a specific position and at a specific spacing on the conveyor belts. The conveyor belts 4 and 6 are designed for clocked operation, that is, the belts can each be stopped for removing a glass vessel 8 from the loading belt or for setting a glass vessel on the unloading belt 6.

The processing unit of FIGS. 1 and 2 includes a pedestal 12 and an upper frame 14 which are shown essentially in FIG. 2 but are omitted from FIG. 1 for the sake of clarity.

Two handling units 16 and 18 are shown in the upper part of FIG. 1 to which reference will first be made. The two handling units 16 and 18 are carried by a frame-fixed longitudinal cross-beam 20 which, referring to FIG. 2, extends perpendicular to the plane of the drawing behind a yoke 22. The handling units 16 and 18 are guided on the longitudinal cross-beam 20 by means of primary carriages 24 and 26 (by means not shown) and can be moved along the cross-beam in the horizontal X direction. The primary carriages 24 and 26 extend downwardly essentially perpendicularly. The primary carriages 24 and 26 are so arranged on both sides of the longitudinal cross-beam 20 that they can also travel past each other. In FIG. 1, the primary carriage 24 is disposed in front of the cross-beam 20 and the primary carriage 26 is disposed behind the cross-beam. Secondary carriages 28 and 30 are guided and movable on corresponding ones of the primary carriages 24 and 26 in the perpendicular direction. As shown in FIG. 2, the secondary carriages (28, 30) carry respective workpiece holders (32, 34) on respective arms (36, 38) directed toward the machine center. The workpiece holders (32, 34) are configured in the form of a rotatable suction cup.

Horizontal movement components are identified by X and vertical movement components are identified by Z. In this context, X1 in FIG. 1 is the drive for horizontal travel of the first handling unit 16 and X2 is the drive for the horizontal travel of the second handling unit 18. Z1 and Z2 are the drives for the vertical travel of the secondary carriages 28 and 30, respectively. C1 and C2 are the rotational drives for the workpiece holders 32 and 34, respectively. All these drives can be driven numerically to precise positions.

From FIG. 2, it can be seen that the axes of the workpiece holders 32 and 34 are on a common vertical plane which extends perpendicularly to the plane of the drawing. The vertical plane is identified as central plane 40. Furthermore, FIG. 2 shows that the workpiece holder 32 having a glass vessel 8 held thereby can be moved over the arm 38 of the other workpiece holder when the two workpiece holders are at an appropriate spacing in elevation. This applies also vice versa. Both workpiece holders 32 and 34 can assume any position in the central plane 40 within the machine frame while appropriately considering a possible collision course.

Reference is now made to the lower portion of FIG. 1. A first workstation 42 is located in the pedestal 12 next to the conveyor belts 4 and 6. This first workstation 42 is for melting off the work ring of a glass vessel 8 and for fusing the resulting edge of the vessel. Take-off tongs 46 are arranged on a support 44 which can be driven out perpendicularly and is likewise movable downwardly. The individual arms of the tongs 46 can be pivoted out and closed over the work ring of the glass vessel 8 to be melted off and to be pulled off. Z3 is the drive for the perpendicular movement of the support 44 and C3 is the rotational drive for the pull-off tongs 46. Burners are not shown with which the separation location on the glass vessel can be warmed and softened.

The work sequence is such that the workpiece holder 32 takes a glass vessel 8 from the loading belt 4 and moves the same horizontally into the workstation 42 where the separation location is heated and the takeoff tongs are closed over the ring and, after appropriate softening of the glass, the work ring is pulled down by means of the pull-off tongs 40 and the support 44. A slide 48 serves to guide the separated rings or other fragments to a fragment belt 50. A second workstation 52 includes a burner 54 for warming that edge location of the glass vessel 8 at which the spout is to be formed. When the work ring has been separated and the resulting edge fused in the workstation 42, the glass vessel is transferred into the workstation 52 where a specific location of the edge is additionally warmed. This location of the edge can be predetermined by the rotational angle control of the workpiece holder. The glass vessel 8 is then moved further into a third workstation 56 wherein only the form work tool 58 for forming the spout is located. The form work tool 58 is provided with a drive B with which it can be actively brought into work contact with the glass vessel.

All workstations 42, 52 and 56 are in the central plane 40 with their imaginary centers so that each glass vessel 8 need be moved only in the X direction and in the Z direction.

It should be clear from the drawing and no sequence description in detail needed that, while a glass vessel 8, which is held by the workpiece holder 32, is processed in the workstation 42, simultaneously a vessel, which is held by workpiece holder 34, can be processed sequentially in the workstations 52 and 56. If the processing there is completed, the workpiece holder 34 moves upwardly and to the right over the workpiece holder 32 in order to set its glass vessel down on the unloading belt 6 while the workpiece holder 32 is moved further with its glass vessel 8 into the workstations 52 and 56.

Figure 3:
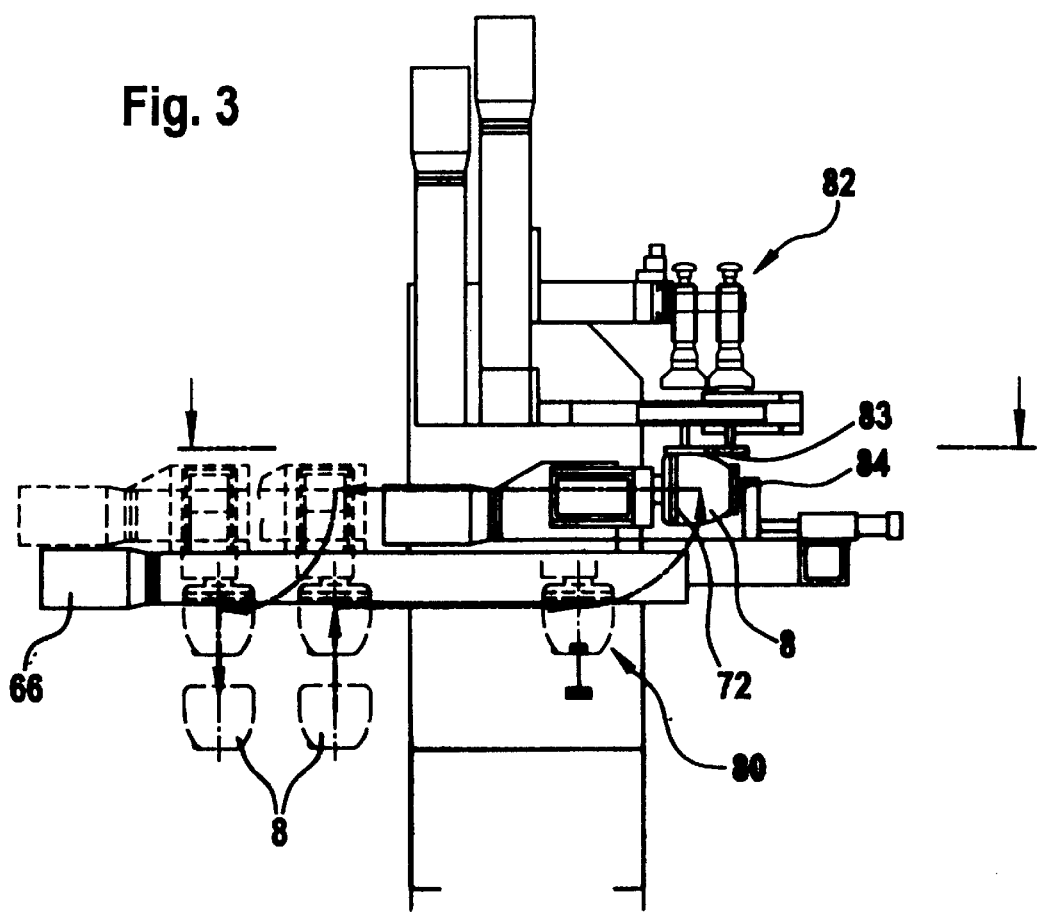
FIG. 3 is a schematic side elevation view of a processing unit for printing hollow glass objects utilizing the silk screen printing process.
Figure 4:
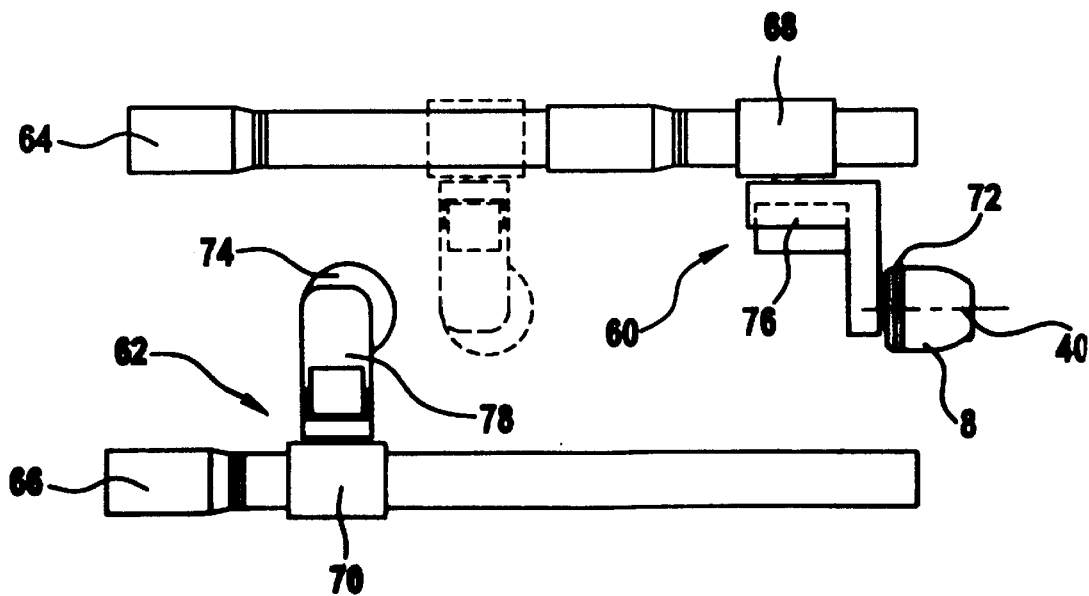
FIG. 4 is a schematic plan view of the two handling units of the processing unit of FIG. 3.
Figure 5:
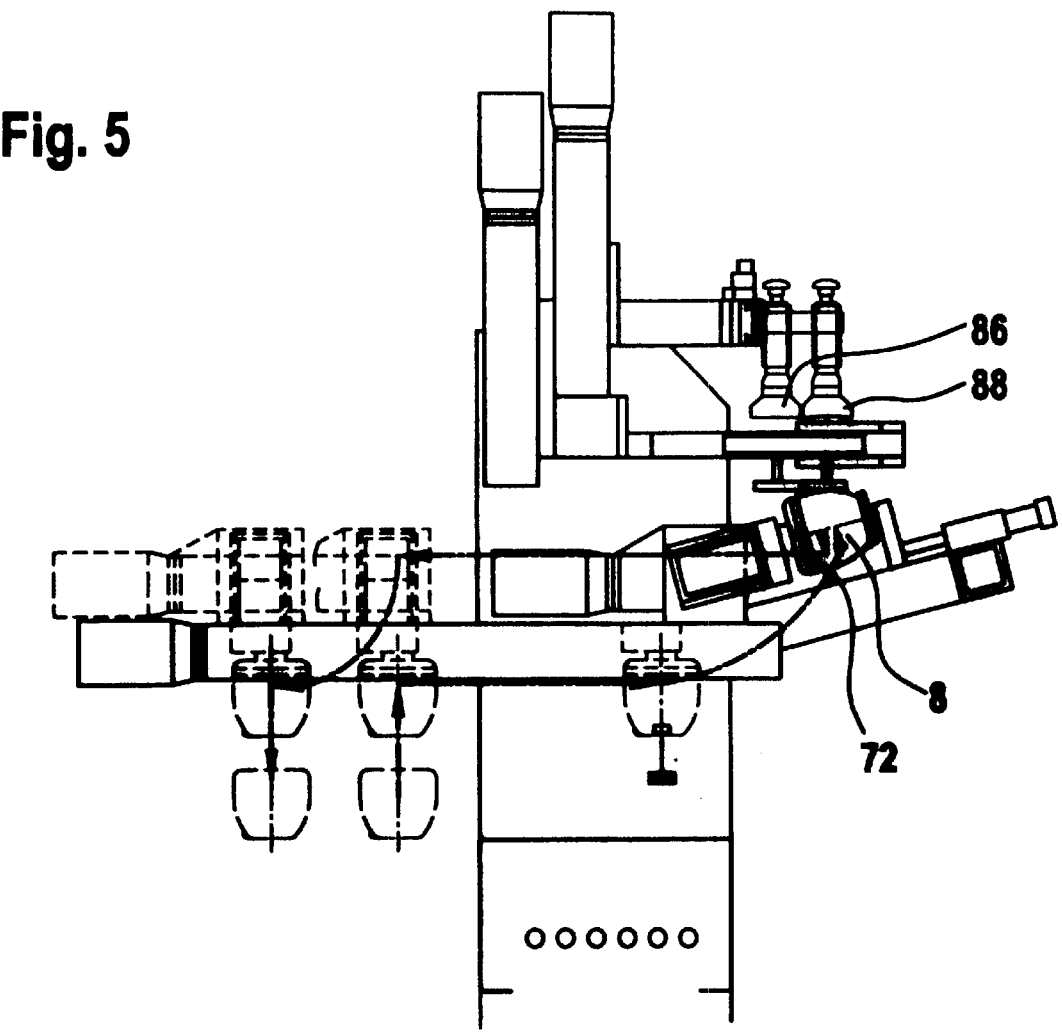
FIG. 5 shows the processing unit of FIG. 3 with a work tool holder in an inclined position for printing a conical surface utilizing the silk screen printing process; and, FIG. 6 is a schematic basic outline diagram of the arrangement of a series of like processing units next to a loading belt and an unloading belt for the transport of the workpieces to be processed to and from the processing units.

In FIGS. 3 to 5, a processing unit for printing the glass vessels in accordance with the silk screen printing method is shown. Only the most essential features are described in combination with this processing unit. In the processing unit of FIGS. 1 and 2, the workpieces are basically held from above, that is, they are processed while suspended and, for this reason, practically all workstations can be disposed at one elevation position and the handling units, in total, are only arranged above these workstations. On the other hand, the processing unit of FIGS. 3 to 5 requires another arrangement because there, work means, that is, the silk screen frame, is brought from above into contact with the workpiece. Correspondingly, and as shown especially in the plan view of FIG. 4, handling units 60 and 62 are mounted at separate lateral longitudinal cross-beams 64 and 66 between which a free space remains for the arrangement of the workstations. Both handling units are here movable horizontally on the longitudinal cross-beams 64 and 66 by means of primary carriages 68 and 70. However, and as especially shown in the demonstration of the handling unit 60 in FIG. 4 to the right, workpiece holders 72 and 74 are held by angular arms 76 and 78 which are each attached with one of their legs on the corresponding primary carriages 68 and 70 so as to be pivotable about the horizontal axis. By pivoting the workpiece holders about these axes, their own axes trace circular rings in the common perpendicular center plane 40. The workpiece holders 72 and 74 are accordingly so configured that the glass vessels 18 held thereby can be held suspended, standing, aligned horizontally or even inclined in the central plane 40. FIG. 4 also shows that a workpiece holder, which is pivoted in the horizontal direction, can be driven above the other workpiece holder when the last-mentioned workpiece holder is in the suspended position because, in this case, the free leg of its angular arm lies lower. Accordingly, for the positions shown in FIG. 4, the handling unit 60 can be moved over the handling unit 62.

It is in this sense that the illustration of FIG. 3 is also to be understood. In the left-hand region, it is indicated that first, to the left, a glass vessel 8 is set down on the unloading belt (not shown) by a workpiece holder and that, thereafter, another glass vessel 8, to the right, is taken up from a loading belt (not shown). The suspendedly held glass vessel is then moved horizontally toward the right into a registration station 80 in which it is brought into a predetermined angular position wherein the printed image is to be applied. Accordingly, when a spout is present, it is, as a rule, usual that a printed image is to be applied precisely at the opposite-lying side. After making the adjustment for registration, the workpiece holder, for example, the workpiece holder 72, is pivoted into a horizontal position and is driven below the silk screen frame 83 of a silk screen printing device 82. At the same time, a rotation support, for example, in the form of a spindle 84 is moved into the open end of the glass vessel 8. Bringing the silk screen frame 83 into contact with the glass vessel 8 can be realized by lowering the silk screen printing device 82 but also by adjusting both handling units 60 and 62 in elevation. After applying the printed image in the silk screen printing device 82, the workpiece holder 72 is moved toward the left in the horizontal direction in that the holder 72 is moved over the other workpiece holder which, for example, can be already located in the registration station 80.

In FIG. 3, the printing of a cylindrical peripheral portion of the glass vessel 8 is shown. However, the glass vessel 8 includes a conical region in the direction toward its opening. This too can be printed in the silk screen printing processing station 82 as shown in FIG. 5. There, the glass vessel 8 is pivoted by means of workpiece holder 72 into such an inclined position that the upper surface line of the conical part of the glass vessel runs horizontally. Correspondingly, the supporting spindle 84 is pivoted therewith. The cylindrical and the conical parts of the glass vessel are provided with two different printed images. For this reason, a divided silk screen frame 83 is provided above which two wipers 86 and 88 are located. As shown in FIG. 5, the right silk screen frame half is used with the right wiper 88 to apply the second printed image onto the conical part. The workpiece holder 72 is therefore additionally moved into the required horizontal position.

Figure 6:
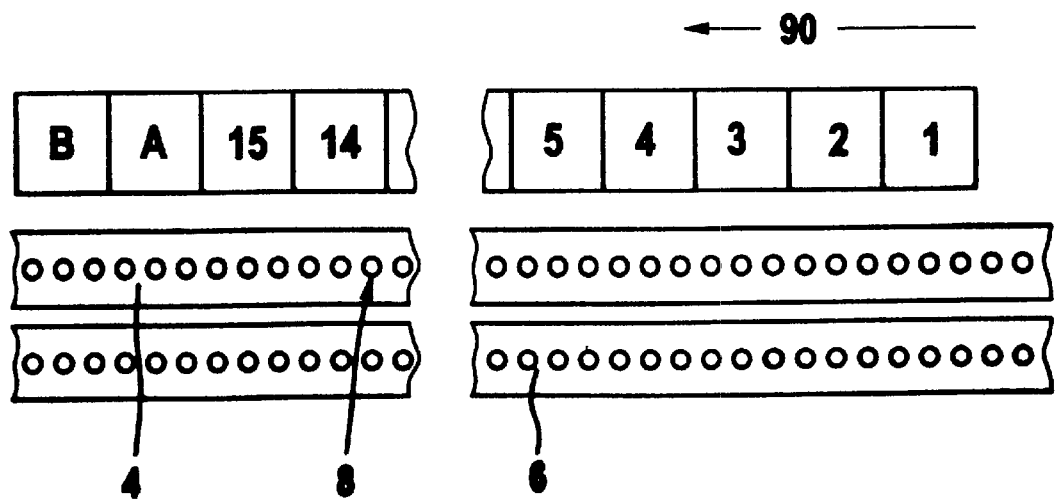

In FIG. 6, a line having several processing units 1 to 15, A and B is shown. The loading belt 4 and the unloading belt 6 run parallel to the processing units. Glass vessels 8 are arranged on the loading and unloading belts 4 and 6. The production direction and therefore also the direction of the conveyor belts is indicated by arrow 90. The indicated processing units are all of the same type, for example, of the type shown in FIGS. 1 and 2 or of the type shown in FIGS. 3 to 5. As described, the conveyor belts 4 and 6 are operated in a clocked manner so that workpieces can be taken over simultaneously by the individual processing units or can again be set down on the unloading belt 6. Loading the loading belt 4 is controlled in such a manner that workpieces reach the correct machine positions.

If a disturbance occurs in one of the processing units 1 to 15, then this unit can be pulled out of the work sequence without affecting the operation of the production line. The processing units A and B show, for example, reserve units from which one can be switched into the production sequence when one of the other units becomes inoperable. Such a machine arrangement is also flexible in such a manner that it can be operated in the same manner depending upon capacity requirements with any desired reduced number of positioned processing units.

It is understood that the foregoing description is that of the preferred embodiments of the invention and that various changes and modifications may be made thereto without departing from the spirit and scope of the invention as defined in the appended claims.

What is claimed is:

1. A machine for processing workpieces of a deformable material including hollow glass objects, the machine comprising:

at least two processing units for the workpieces and each processing unit having at least two workstations;

a conveyor unit for supplying said processing units with the workpieces to be processed and for taking processed workpieces away from the processing units;

the conveyor unit being configured to move the workpieces in a basic direction;

said two processing units being of the same kind and being arranged along said conveyor unit;

said workstations of each processing units being arranged stationary;

each processing unit including two handling units and each of said handling units functioning to take a workpiece from the conveyor unit, move the workpiece to and in said workstation and return the processed workpiece back to the conveyor unit; and, said handling units being configured to perform like functions in a time-displaced work sequence to process at least two of said workpieces simultaneously in a direction which runs essentially transversely to said basic direction of the conveyor unit;

said conveyor unit including a loading conveyor belt and an unloading conveyor belt which run parallel to each other;

said basic direction being a linear direction; and, said conveyor unit being configured for a controlled clocked operation for respectively taking up and returning the workpieces from and to the conveyor unit when said conveyor unit is at standstill.

2. The machine of claim 1, wherein one of said workstations is a first workstation and another one of said workstations is a second workstation; and, said first workstation is different from said second workstation.

3. The machine of claim 2, wherein a plurality of like ones of said processing units is arranged along said conveyor unit of which each can be selectively taken into the work sequence in a controlled manner.

4. The machine of claim 3, wherein the processing units are configured to be modular and can be exchanged.

5. A processing unit for a machine wherein workpieces of a deformable material including hollow glass objects are processed, the machine including a conveyor unit for supplying the processing unit with the workpieces to be processed and for taking processed workpieces away from the processing unit, the processing unit being provided for processing the workpieces and comprising:

at least one workstation for carrying out a processing step on a workpiece;

first and second handling units separate from each other and having respective workpiece holders for taking up first and second ones of said workpieces, respectively, from said conveyor unit, moving said first and second workpieces to and into said one workstation and returning said first and second workpiece, after processing, to said conveyor unit; and, said handling units being configured to perform like functions in a time-displaced work sequence to process at least two of said workpieces simultaneously;

said machine defining a vertical center plane and including a frame having guides on respective sides of said plane for guiding corresponding ones of said first and second handling units;

said first and second handling units including first and second primary carriages, respectively, for moving said handling unit horizontally and linearly along said guides, respectively, on opposite sides of said vertical center plane;

said handling units having respective workpiece holders;

said vertical center plane passing through said workstation and said workpiece holders; and, means for moving each of said workpiece holders in elevation in said vertical central plane relative to the primary carriage corresponding thereto to avoid mutual collision when said first and second primary carriages move in mutually opposing directions.

6. The processing unit of claim 5, wherein the workpiece holders can be rotated and/or can be driven to be positioned at a rotational angle.

7. The processing unit of claim 6, wherein the workpiece holders are suction cups or chucks.

8. The processing unit of claim 7, wherein each of said workpiece holders define an axis lying in said vertical central plane; and, said processing unit further comprising projecting arms for carrying said workpiece holders, respectively; and, said projecting arms projecting from the side into the region of said vertical central plane.

9. The processing unit of claim 8, wherein said first and second primary carriages include respective guides; said first and second handling units include first and second secondary carriages, respectively, mounted for movement in elevation on the guides of said first and second primary carriages, respectively; and, said projecting arms being mounted on said secondary carriages, respectively, for movement in elevation.

10. The processing unit of claim 9, wherein each of the workpieces is a vessel of thermoplastic material including a glass vessel and said processing unit is for melting off an edge of the vessel and for forming a spout therein; and, wherein said workstation is a first workstation and said processing unit comprises second and third workstations; and, said workstations are arranged below said handling units in a row one next to the other with their centers in said vertical central plane; said first workstation being an edge melt-off station; said second workstation being a preheating station for the region of the spout; and, said third workstation being a forming station for forming the spout.

11. The processing unit of claim 10, wherein said first workstation includes take-off tongs and a traction-force controlled drive for moving said take-off tongs in elevation, said take-off tongs being closable from below around the edge of the vessel which is to be melted off; and, a rotation drive for rotating said take-off tongs in angular synchronism with the workpiece holder.

12. The processing unit of claim 11, wherein said workpiece holders are suction cups for holding the vessels at their base; and, said vessels being supplied with their bases directed upwardly.

13. The processing unit of claim 8, wherein said projecting arms are pivotably attached to the primary carriages in such a manner that the workpiece holders describe a circular path in said vertical central plane.

14. The processing unit of claim 13, wherein the workpieces are rotationally-symmetrical workpieces having a cylindrical or conical surface and said processing unit is for utilizing a silk screen printing process to print on the workpiece; the processing unit further comprising at least one silk screen printing station for printing the workpiece; and, a registration station for aligning the workpiece precisely with respect to rotational angle.

15. The processing unit of claim 14, said silk screen printing station being arranged above said handling units and having a silk screen frame lying horizontally therebelow; and, said handling unit functioning to pivot said workpiece into a horizontal position to bring said workpiece into contact with the silk screen frame via relative vertical displacement between the handling unit and said silk screen frame; and, means for rolling said silk screen frame on the workpiece which is rotatably journalled or rotatably driven.

16. The processing unit of claim 15, further comprising a support spindle for an end of the workpiece not held during the rotation thereof when printing.

17. The processing unit of claim 16, wherein said silk screen frame has several printing regions or additional silk screen stations provided for applying two or more printed images on the workpiece; and, wherein the workpiece can be moved by the handling unit into the different printing positions by horizontal movement.

18. The processing unit of claim 17, wherein, for printing conical surfaces, the workpiece is pivoted into an inclined position with horizontal alignment of the above-mentioned surface of the conical region; and, the silk screen frame is rolled about the imaginary intersect point of the surface lines of the conical region pivotably on the conical region.

* * * * *